3,033,751
HEPARYLUREAS AND PREPARATION THEREOF

Léon Velluz, Paris, Gérard Nominé, Noisy-le-Sec, and Daniel Bertin, Montrouge, France, assignors to UCLAF, Paris, France, a corporation of France
No Drawing. Filed May 12, 1960, Ser. No. 28,516
Claims priority, application France May 16, 1959
15 Claims. (Cl. 167—74)

This invention relates to a process for producing ureas substituted with hydrocarbon radicals by reacting heparamine compounds with isocyanates. The invention further relates to the novel compounds produced by such a reaction.

In copending application Serial No. 824,676, commonly assigned, filed July 2, 1959, there is described a process for the preparation of acyl derivatives of N-desulfoheparine or heparamine wihch consists of preparing heparamine starting from heparine and acylating, by submitting heparine first to the action of a lower alcohol, such as methanol, in order to free the amine functions, hydrolysing the ester formed by the action of an alkaline base, isolating heparamine practically devoid of physiological activity by precipitation with a hydrosoluble reagent and acylating by the action of a functional derivative of an acid in an aqueous medium. The acyl derivatives of heparides thus obtained possess only a minimum of anticoagulant activity and a strong antilipemic activity.

It is an object of our invention to provide a process for transforming heparamine into substituted ureas.

Another object is the obtention of novel substituted urea compounds which have strong antilipemic activity but very low anticoagulant activity.

These and other objects of our invention will become apparent as the description thereof proceeds.

We have now found that the transformation of heparamine to substituted urea leads to compounds having equally as strong antilipemic activity as those of the copending application, whereas their anticoagulant activity is considerably less. This transformation may be accomplished by the reacting of a substituted isocyanate with heparamine. If the glucuronic acid-glucosamine chain of heparamine is designated by R—NH, the reaction is effected according to the equation:

R—NH$_2$+R'N=C=O→R—NH—CO—NH—R'

(R' being an alkyl, aryl, or aralkyl radical) by reaction of an isocyanate R'N=C=O with heparamine.

R' represents more definitely radicals of the following groups: alkyl radicals having up to 20 carbon atoms such as butyl, octyl, dodecyl and hexadecyl radicals; aromatic radicals having up to 20 carbon atoms, for example phenyl or naphthyl radicals; and alkyl substituted radicals such as tolyl radicals; and aralkyl radicals such as benzyl, phenethyl, xylylene and the like.

According to the preferred method, the isocyanate is reacted in excess with an aqueous solution of an alkaline salt of heparamine. The reaction is conducted preferably in an alkaline medium, produced by the addition of an alkali metal hydroxide or its carbonate and in the presence of a mutual solvent facilitating the contact between the isocyanate insoluble in water and heparamine. The urea formed is soluble in the reaction media and is separated by filtration or centrifuging from the insoluble carbamate and can be isolated by precipitation with a water soluble organic solvent. For purification we can either dissolve the urea product in water and reprecipitate with solvents or while still in aqueous solution form a high-molecular weight ammonium salt which is soluble in butanol and from which the urea product can be extracted in the form of a water soluble salt of an alkaline metal by double decomposition with an aqueous solution of an alkaline salt of a lower acid. From this aqueous solution the pure urea product is finally precipitated in the state of its alkaline salt by the addition of an inert organic solvent miscible in water in which it is insoluble.

Quaternary ammonium salts particularly convenient for this purification are preferably high molecular weight quaternary ammonium salts capable of producing water insoluble salts with the urea product by double decomposition such as the preferred benzyldimethyl-2-[2-(p-1,1, 3,3-tetramethylbutyl-phenoxy)-ethoxy]-ethyl ammonium chloride having the empirical formula $C_{27}H_{42}ClNO_2.H_2O$ and the structural formula

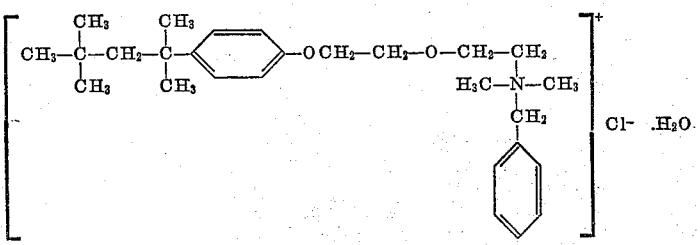

hereinafter referred to by its commercial name "Hyamine 1622," also known as phemerol chloride or benzethonium chloride.

We can also use according to the process of the present invention other high molecular weight quaternary ammonium salts, notably "Hyamine 2389" described in the Index of Modern Sulfonated Oils and Detergents by J. P. Sisley, vol. 2, page 373, as being the chloride of a quaternary ammonium base, "Cequartyl BE" described on page 287 of the above-mentioned index as "being based on ammonium salts," "Arquad 2C" which, according to the same index, page 261, is alkyl dilauryl dimethyl ammonium chloride and "Zephirol" which, according to the same index on page 286 is alkyl dimethylbenzyl ammonium chloride.

The following examples are set forth to illustrate our invention and to enable persons skilled in the art to better understand and practice the invention and are not intended to limit the same.

Example I

PREPARATION OF HEPARYLBUTYLUREA
(R—NH—CO—NH—R')
[(Sodium salt) R'=C$_4$H$_9$]

5 gm. of heparamine, in the form of its potassium salt, were dissolved in 20 cc. of water while mechanically agitating, and, without interrupting the agitation, 5 cc. of isopropanol, then 0.5 gm. of sodium carbonate and finally 10 cc. of butyl isocyanate were added. Agitation was continued at 20 to 25° C. for 20 hours. An abundant precipitate was formed which actually consisted of an N-butyl carbamate. 60 cc. of water were added and the mixture was vacuum filtered. The insoluble portion was washed with water and the wash waters were combined with the filtrate. The clear solution, thus obtained, was treated with 150 cc. of a solution containing 10% "Hyamine 1622" chlorohydrate. An abundant precipitate was formed which was vacuum filtered and the filter cake was washed with water. The "Hyamine" salt of heparylbutylurea formed thereby, which was still damp, was dissolved in 150 cc. of normal butanol saturated with water. The excess aqueous phase was decanted and the butanol phase was extracted four times, each time with 25 cc. aliquot of a 25% aqueous solution of sodium acetate. The pH of the combined extracts was adjusted to 7 to 7.5 by the addition of acetic acid and the solution was filtered in the presence of a filter aid. From the clear filtrate, heparylbutylurea in the form of its sodium salt was precipitated, by pouring it, under agitation, into 600 cc. of ethanol. The precipitate was vacuum filtered and washed with ethanol, then with ether. After drying in vacuo, 4.4 gm. of heparylbutylurea in the form of its sodium salt, that is a yield of 80% of theory, were obtained. The product had an antilipemic activity of 95 to 110 units per milligram while the anticoagulant activity was less than 20 units. A titration of the free amine function showed all it contained less than 1.5% of free $NH_2$ groups when expressed as heparamine.

The specific rotation $[\alpha]_D^{20} = +52.8°$ (c.=1% in water).

This compound is not described in the literature.

*Example II*

PREPARATION OF HEPARYLPHENYLUREA
(R—NH—CO—NH—R′)
[(Sodium salt) R′=C₆H₅]

1 gm. of heparamine (potassium salt) was dissolved in 4 cc. of water and, while mechanically agitating, 1 cc. of isopropanol and 1 cc. of phenyl isocyanate were added. The agitation was continued for 20 hours at 20 to 25° C. The precipitate formed thereby, which actually consisted of an N-phenylcarbamate, was vacuum filtered, then washed with water. The wash waters were combined with the filtrate and the pH was adjusted to 8 by the addition of 5 N sodium hydroxide. The solution was filtered again in the presence of a filter aid and the filtrate was poured into 100 cc. of methanol. The precipitated heparylphenylurea, formed thereby, was vacuum filtered, washed with methanol, then with ether and finally dried in vacuo. 900 mgm. of heparylphenylurea (sodium salt) were obtained. The product showed an anti-lipemic activity of 127 units per milligram, the anticoagulant activity being only 12 units per milligram.

The titration of the free amine function showed that the compound contained less than 1.5% of free $NH_2$ groups when expressed as heparamine.

The compound is not described in the literature.

*Example III*

PREPARATION OF HEPARYL-α-NAPHTHYLUREA
(R—NH—CO—NH—R′)
[(Sodium salt) R=C₁₀H₈]

Working as in Example 1, a solution of 1 gm. of the potassium salt of heparamine in 4 cc. of water was reacted with 2.2 cc. of α-naphthyl-isocyanate in the presence of 1 cc. of isopropanol and 0.1 gm. of sodium carbonate. After vacuum filtration of the precipitate, formed thereby, which actually consisted of an N-α-naphthyl-carbamate, the sodium carbonate was decomposed off by addition of formic acid, and sodium hydroxide was added until the pH reached 7.0 to 7.5. After again filtering in the presence of a filter aid the product was precipitated from 10 volumes of methanol. The precipitate was vacuum filtered, washed with methanol, then with ether and dried in vacuo. 621 mgm. of heparyl-α-naphthylurea were obtained with a specific rotation $[\alpha]_D^{20} = +38.9°$ (c.=1% in water). The product showed an antilipemic activity of 98 units per milligram, the anticoagulant activity being only 5 units per milligram. The determination of the free amine functions showed that the product contained not more than 1.5% of $NH_2$ groups when expressed as heparamine.

This compound is not described in the literature.

Since the examples given above are non-limiting, it is possible, without departing from the scope of the invention, to vary the nature of the solvents used for the reaction, as well as those solvents in which the heparylurea precipitate is formed. Thus, it is possible to effect the reaction in the presence of normal propyl alcohol, butanol, and the like, and perform the final precipitation in methanol, ethanol, acetone, dioxan and the like. Also, in place of the quaternary ammonium salt, it is possible to use for the purification in Example I, one of the other quaternary ammonium salts mentioned in the introduction and it will be understood by persons skilled in the art that it is possible to replace the sodium carbonate used in the course of the reaction with potassium, ammonium or lithium carbonate, or also to operate in the absence of these alkaline agents.

While we have set forth certain specific embodiments and preferred modes of practice of our invention, it will be understood that the invention is not limited thereto and that various changes and modifications may be made in the invention without departing from the spirit of the disclosure and the scope of the appended claims.

We claim:
1. Compounds of the general formula

R—NH—CO—NH—R′ wherein R—NH designates the glucuronic acid-glucosamine chain of heparamine and R′ is a radical selected from the group consisting of alkyl, aryl and aralkyl radicals.

2. n-Butyl heparylurea.

3. Phenyl heparylurea.

4. α-Naphthyl heparylurea.

5. A process for producing substituted heparylurea compounds which comprises reacting an isocyanate with an aqueous solution of an alkali metal salt of heparamine, and separating the substituted heparylurea product formed.

6. A process for the preparation of compounds of the general formula

R—NH—CO—NH—R′ wherein R—NH designates the glucuronic acid-glucosamine chain of heparamine and R′ is a radical selected from the group consisting of alkyl, aryl or aralkyl radicals, which comprises reacting an isocyanate having the general formula R′—N=C=O, wherein R′ is a radical as above defined, with an aqueous solution of an alkali metal salt of heparamine, separating the insoluble portion formed thereby and isolating the substituted heparylurea.

7. A process for the preparation of compounds of the general formula

R—NH—CO—NH—R′ wherein R—NH designates the glucuronic acid-glucosamine chain of heparamine and R′ is a radical selected from the group consisting of alkyl, aryl or aralkyl radicals, which comprises reacting an isocyanate having the general formula R′—N=C=O, wherein R′ is a radical as above defined, with an aqueous solution of an alkali metal salt of heparamine, separating the insoluble portion formed thereby and isolating the substituted heparylurea by precipitation with a water-soluble solvent.

8. The process of claim 7 wherein the water soluble solvent is selected from the group consisting of methanol, ethanol, acetone and dioxane.

9. A process for the preparation of compounds of the general formula

R—NH—CO—NH—R' wherein R—NH designates the glucuronic acid-glucosamine chain of heparamine and R' is a radical selected from the group consisting of alkyl, aryl or aralkyl radicals, which comprises reacting an isocyanate having the general formula R'—N=C=O, wherein R' is a radical as above defined with an aqueous solution of an alkali metal salt of heparamine, separating the insoluble portion formed thereby, isolating the substituted heparylurea by precipitation with a water-soluble solvent, purifying, by redissolution and reprecipitation, and separating said urea compound.

10. A process for the preparation of compounds, of the general formula

R—NH—CO—NH—R' wherein R—NH designates the glucuronic acid-glucosamine chain of heparamine and R' is a radical selected from the group consisting of alkyl, aryl or aralkyl radicals, which comprises reacting an iscyanate having the general formula R'—N=C=O wherein R' is a radical as above defined with an aqueous solution of an alkali metal salt of heparamine, separating the insoluble portion formed thereby, isolating the substituted heparylurea by precipitation with a water-soluble solvent, purifying, by reacting with a high molecular quaternary ammonium salt, and separating said urea compound.

11. A process for the preparation of compounds of the general formula

R—NH—CO—NH—R' wherein R—NH designates the glucuronic acid-glucosamine chain of heparamine and R' is a radical selected from the group consisting of alkyl, aryl or aralkyl radicals, which comprises reacting in an alkaline medium, an isocyanate having the general formula R'—N=C=O, wherein R' is a radical as above defined with an aqueous solution of an alkali metal salt of heparamine, separating the insoluble portion formed thereby by filtration, centrifugation or decantation, isolating the substituted heparylurea by precipitation with a water-soluble solvent.

12. The process of claim 11 wherein the alkaline agent is selected from the group consisting of alkali metal hydroxides and carbonates.

13. A process for the preparation of compounds of the general formula

R—NH—CO—NH—R' wherein R—NH designates the glucuronic acid-glucosamine chain of heparamine and R' is a radical selected from the group consisting of alkyl, aryl or aralkyl radicals, which comprises reacting in an alkaline medium, an isocyanate having the general formula R'—N=C=O, wherein R' is a radical as above defined with an aqueous solution of an alkali metal salt of heparamine, in the presence of a mutual solvent for both reactants, separating the insoluble portion formed thereby by filtration, centrifugation or decantation, isolating the substituted heparylurea by precipitation with a water-soluble solvent.

14. The process of claim 13 wherein the mutual solvent is selected from the group consisting of propanol, isopropanol and butanol.

15. A process for the preparation of compounds of the general formula

R—NH—CO—NH—R' wherein R—NH designates the glucuronic acid-glucosamine chain of heparamine and R' is a radical selected from the group consisting of alkyl, aryl or aralkyl radicals, which comprises reacting an isocyanate having the general formula R'—N=C=O wherein R' is a radical as above defined with an aqueous solution of an alkali metal salt of heparamine, separating the insoluble portion formed thereby by filtration, centrifugation or decantation, isolating the substituted heparylurea by precipitation with water-soluble solvent, and purifying by transformation into a quaternary ammonium salt, taking up in butanol, extracting with an aqueous solution of an alkali metal salt of a lower aliphatic acid, and precipitating with a water soluble solvent.

No references cited.